A. KEGRESSE.
MOTOR SLEDGE.
APPLICATION FILED APR. 21, 1913.
1,096,815.
Patented May 12, 1914.
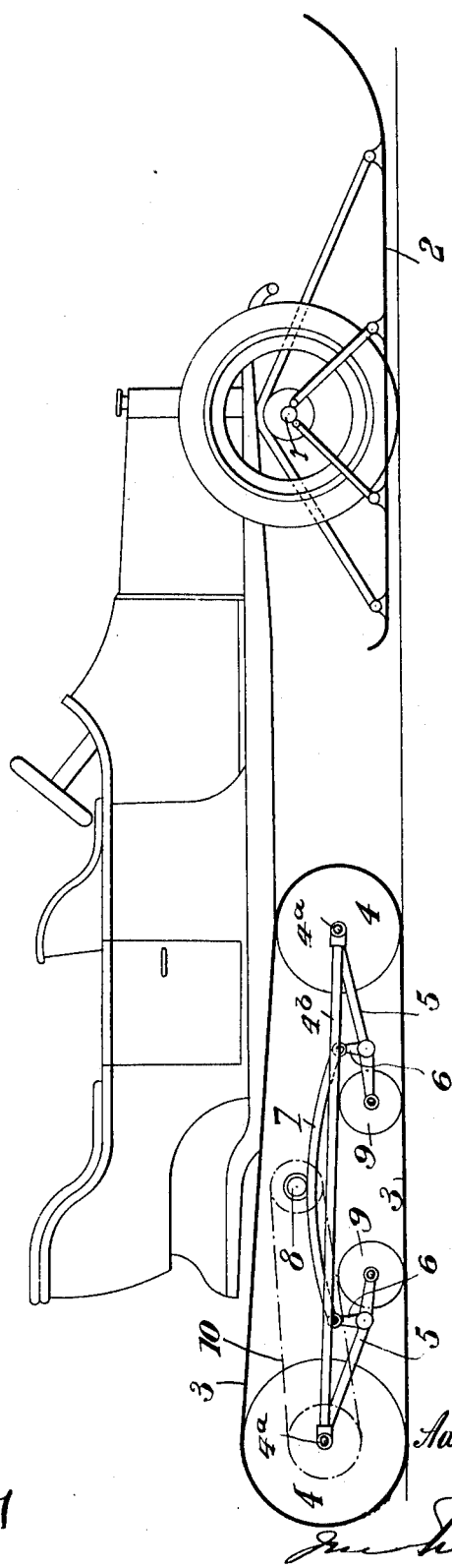
Witnesses:
W. Williams
John H. Troy
Inventor:
Adolphe Kégresse
_____ Attorney.

UNITED STATES PATENT OFFICE.

ADOLPHE KEGRESSE, OF TSARSKOYE SELO, RUSSIA.

MOTOR-SLEDGE.

1,096,815.  Specification of Letters Patent. Patented May 12, 1914.

Application filed April 21, 1913. Serial No. 762,644.

*To all whom it may concern:*

Be it known that I, ADOLPHE KÉGRESSE, a citizen of France, and resident of Tsarskoye Selo, Russia, have invented certain new and useful Improvements in Motor-Sledges, of which the following is a specification.

The proposed combination of a motor-car and a sledge offers the possibility of progressing in any desired district as it allows to change from wheels to runners and vice versa.

The characteristic features of this invention reside in the employment of rotary sledge runners which are secured to the rotating ends of the front axle and in the driving mechanism which is connected with the motor of the vehicle and forms therewith the rear runners of the sledge.

The invention is shown in the accompanying drawing the figure of which shows by way of example the side elevation view of one form of embodiment of the proposed motor sledge.

Secured to the ends of the front axle 1 are two very large runners 2 which are provided with openings adapted to let pass a part of the front wheels; these runners are mounted in such a manner that when the vehicle travels over solid ground (not covered with snow) they are a short distance above the ground and that when the vehicle encounters a snow covered surface, the runners adjust themselves automatically on this surface in such a manner that the motor car from progressing on the wheels starts progressing on the runner. These front runners can be provided with a device of adjusting their height above the ground so as to allow of their travel on various kinds of grounds. When the vehicle again passes over to a snow free surface the runners are again lifted from the latter and the motor car continues traveling on the wheels.

The sledge is driven by two endless belts 3 one of which is provided on each side and which passes over the pulleys 4 mounted on the rear part of the vehicle. Each pulley 4 is mounted on the end of a lever 5 so as to be able to freely rotate thereon. Each lever 5 is provided with an integral link 6, the upper ends of said links being pivoted to the ends of the leaf springs 7, mounted on the rear axle. The inner ends of the levers 5 are provided with a guide-roller 9 which contributes in securing the continuous tensioning of the lower half of the belt. The outer ends of the levers 5 are pivotally supported on the shafts 4$^a$, and connecting the shafts is a horizontal bar 4$^b$. In this manner the full elasticity of the system as well as the distribution of the load over the whole length of the belt are ascertained. The rear pulley 4 is besides surrounded by the transmission chain 10 which engages a wheel on the rear axle 8 of the motor car and imparts rotary motion to the said pulley 4. In this manner the belts 3 are continuously driven by the action of the motor of the vehicle. This driving device occupies such a position that it is adapted to travel both on solid ground and on layers of snow of different thickness.

Moving in one direction or the other under the action of the motor, the belts cause the sledge to travel forward or backward and at the same time keep the motor sledge on the surface of the snow.

Having now fully described my said invention, what I claim and desire to secure by Letters Patent is:

1. In combination, a vehicle frame, an axle on the vehicle frame, leaf springs mounted on the axle, a system of levers supported by the leaf springs, rollers mounted on the system of levers, traction belts passing around certain of the rollers, and means operated from the axle to rotate the rollers and move the traction belts.

2. In combination, a motor vehicle including a power driven shaft, longitudinal springs mounted on the shaft, arms having integral extensions, the latter pivoted to the ends of the longitudinal springs, rollers at the lower ends of the arms, a bar pivotally connected to the upper ends of adjacent arms, rollers mounted at the ends of the bar, traction belts engaging the last mentioned rollers, and means between the power driven shaft and the last mentioned rollers for operating the belts, the first mentioned rollers engaging the belts and holding the latter in contact with the surface traveled on.

In testimony whereof I have hereunto set my hand in presence of two witnesses.

A. KÉGRESSE.

Witnesses:
F. A. LOVIAGUIN,
H. MOLCURYNSKY.